United States Patent
Makwinski et al.

(10) Patent No.: US 11,984,731 B2
(45) Date of Patent: May 14, 2024

(54) ECOSYSTEM FOR SURFACE-BASED WIRELESS CHARGING SYSTEM

(71) Applicant: The Wiremold Company, West Hartford, CT (US)

(72) Inventors: Mark Makwinski, Cromwell, CT (US); Richard R. Picard, West Hartford, CT (US); Phillip D. Prestigomo, Simsbury, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 107 days.

(21) Appl. No.: 14/978,251

(22) Filed: Dec. 22, 2015

(65) Prior Publication Data
US 2016/0181859 A1    Jun. 23, 2016

Related U.S. Application Data

(60) Provisional application No. 62/097,723, filed on Dec. 30, 2014, provisional application No. 62/095,451, filed on Dec. 22, 2014.

(51) Int. Cl.
| | | |
|---|---|---|
| *H02J 50/12* | (2016.01) | |
| *H02J 7/00* | (2006.01) | |
| *H02J 50/40* | (2016.01) | |

(52) U.S. Cl.
CPC ............ *H02J 50/12* (2016.02); *H02J 7/0049* (2020.01); *H02J 50/402* (2020.01)

(58) Field of Classification Search
CPC .......... H02J 7/025; H02J 7/0047; H02J 50/12; H02J 50/40; H02J 50/70; H02J 50/80; H02J 50/90; H02J 50/20; H02J 50/60
USPC .......................................................... 320/108
See application file for complete search history.

(56) References Cited

U.S. PATENT DOCUMENTS

| | | | |
|---|---|---|---|
| 6,168,079 B1 | 1/2001 | Becker et al. | |
| 7,211,986 B1 | 5/2007 | Flowerdew et al. | |
| 7,830,116 B2 * | 11/2010 | Toya ....................... | H02J 7/025 320/108 |
| 7,908,978 B1 * | 3/2011 | Pelton, Jr. .............. | A47B 21/06 108/50.01 |
| 7,952,322 B2 | 5/2011 | Partovi et al. | |
| 8,049,370 B2 | 11/2011 | Azancot et al. | |

(Continued)

FOREIGN PATENT DOCUMENTS

| | | |
|---|---|---|
| CN | 102035010 A | 4/2011 |
| JP | 2012 165553 A | 8/2012 |

(Continued)

OTHER PUBLICATIONS

Machine translation of KR-20160095646-A. (Year: 2023).*

(Continued)

*Primary Examiner* — David V Henze-Gongola
(74) *Attorney, Agent, or Firm* — McCormick, Paulding & Huber, PLLC (57) ABSTRACT

A wireless charging system includes a power supply, a plurality of wireless charging transmitters adapted to be mounted on an underside of a surface, and a power distribution system adapted to connect the plurality of wireless charging transmitters to the power supply. The plurality of wireless charging transmitters are configured to generate charging areas on a top side of the surface.

16 Claims, 10 Drawing Sheets

(56) References Cited

U.S. PATENT DOCUMENTS

| | | | |
|---|---|---|---|
| 8,228,026 B2* | 7/2012 | Johnson | A47B 96/02 320/108 |
| 8,373,386 B2* | 2/2013 | Baarman | H02J 7/00 320/108 |
| 8,618,695 B2 | 12/2013 | Azancot et al. | |
| 8,618,770 B2* | 12/2013 | Baarman | G06Q 30/0261 320/108 |
| 8,766,484 B2 | 7/2014 | Baarman et al. | |
| 8,829,727 B2 | 9/2014 | Urano | |
| 8,855,554 B2 | 10/2014 | Cook et al. | |
| 9,124,308 B2 | 9/2015 | Metcalf | |
| 9,148,201 B2 | 9/2015 | Kallal et al. | |
| 9,184,632 B2* | 11/2015 | Kirby | G06K 19/0723 |
| 9,247,373 B2* | 1/2016 | Golsch | H02J 7/025 |
| 9,318,905 B2* | 4/2016 | Tsang | H02J 50/30 |
| 9,325,186 B2* | 4/2016 | Yang | H02J 50/40 |
| 9,438,070 B2 | 9/2016 | Byrne et al. | |
| 9,484,751 B2 | 11/2016 | Byrne et al. | |
| 9,667,092 B2 | 5/2017 | Miller et al. | |
| 9,793,738 B2 | 10/2017 | Jacobs et al. | |
| 10,063,107 B2 | 8/2018 | Makwinski et al. | |
| 10,170,908 B1* | 1/2019 | Catalano | H02J 50/40 |
| 10,381,880 B2* | 8/2019 | Leabman | H02J 50/80 |
| 10,439,448 B2* | 10/2019 | Bell | H02J 13/0075 |
| 2004/0124164 A1* | 7/2004 | Perkins | B25H 1/02 211/94.01 |
| 2005/0017677 A1 | 1/2005 | Burton et al. | |
| 2007/0103110 A1 | 5/2007 | Sagoo | |
| 2007/0279002 A1 | 12/2007 | Partovi | |
| 2007/0287508 A1* | 12/2007 | Telefus | H02J 5/005 455/572 |
| 2008/0061733 A1* | 3/2008 | Toya | H02J 50/10 320/103 |
| 2009/0096413 A1* | 4/2009 | Partovi | H01F 5/003 320/108 |
| 2009/0212638 A1* | 8/2009 | Johnson | A47B 96/18 307/104 |
| 2009/0212737 A1 | 8/2009 | Johnson et al. | |
| 2009/0218884 A1* | 9/2009 | Soar | F41H 1/02 307/11 |
| 2009/0243397 A1* | 10/2009 | Cook | H02J 5/005 307/104 |
| 2009/0271642 A1* | 10/2009 | Cheng | G06F 1/263 713/300 |
| 2009/0278493 A1 | 11/2009 | Alden | |
| 2009/0278505 A1 | 11/2009 | Toya et al. | |
| 2010/0070219 A1* | 3/2010 | Azancot | H02J 5/005 702/62 |
| 2010/0127660 A1 | 5/2010 | Cook et al. | |
| 2010/0174629 A1* | 7/2010 | Taylor | G06Q 20/10 705/34 |
| 2010/0201312 A1 | 8/2010 | Kirby et al. | |
| 2010/0270970 A1* | 10/2010 | Toya | H02J 7/0027 320/108 |
| 2010/0290215 A1* | 11/2010 | Metcalf | A47B 21/00 362/127 |
| 2011/0006603 A1* | 1/2011 | Robinson | G06F 1/263 307/31 |
| 2011/0018360 A1* | 1/2011 | Baarman | H02J 7/0027 307/104 |
| 2011/0025263 A1* | 2/2011 | Gilbert | H02J 7/00712 320/108 |
| 2011/0057606 A1* | 3/2011 | Saunamaki | H02J 50/90 320/108 |
| 2011/0062916 A1 | 3/2011 | Farahani | |
| 2011/0074349 A1* | 3/2011 | Ghovanloo | H02J 50/90 320/108 |
| 2011/0077878 A1* | 3/2011 | Lathrop | H02J 13/0003 702/62 |
| 2011/0089894 A1* | 4/2011 | Soar | H01F 27/365 320/108 |
| 2011/0156640 A1* | 6/2011 | Moshfeghi | H02J 50/20 320/108 |
| 2011/0181240 A1* | 7/2011 | Baarman | H04B 5/0037 320/108 |
| 2011/0184842 A1* | 7/2011 | Melen | B60L 53/12 705/34 |
| 2011/0199028 A1* | 8/2011 | Yamazaki | H02J 7/025 318/139 |
| 2011/0211380 A1* | 9/2011 | Brown | H02M 3/33561 363/131 |
| 2011/0241603 A1 | 10/2011 | Chang et al. | |
| 2011/0258251 A1 | 10/2011 | Antoci | |
| 2011/0260532 A1* | 10/2011 | Tanabe | H01M 10/44 307/17 |
| 2012/0049642 A1* | 3/2012 | Kim | H02J 5/005 307/104 |
| 2012/0053657 A1* | 3/2012 | Parker | A61N 1/3787 607/61 |
| 2012/0235636 A1 | 9/2012 | Partovi | |
| 2012/0278640 A1* | 11/2012 | Caglianone | G06F 1/3231 713/323 |
| 2012/0313577 A1* | 12/2012 | Moes | H02J 7/025 320/108 |
| 2013/0005251 A1* | 1/2013 | Soar | H02J 7/025 455/41.1 |
| 2013/0038272 A1* | 2/2013 | Sagata | B60L 3/12 320/106 |
| 2013/0038280 A1 | 2/2013 | Boundy et al. | |
| 2013/0049682 A1 | 2/2013 | Niec et al. | |
| 2013/0075557 A1* | 3/2013 | Hsiao | H02G 3/185 248/223.41 |
| 2013/0093257 A1* | 4/2013 | Goto | H02J 50/10 307/104 |
| 2013/0106197 A1* | 5/2013 | Bae | H04B 5/0037 307/104 |
| 2013/0106353 A1 | 5/2013 | Foster | |
| 2013/0134794 A1* | 5/2013 | Lee | H02J 7/025 307/104 |
| 2013/0147429 A1 | 6/2013 | Kirby et al. | |
| 2013/0154555 A1 | 6/2013 | Miller et al. | |
| 2013/0157488 A1 | 6/2013 | Zhang et al. | |
| 2013/0169222 A1* | 7/2013 | Yoon | H02J 7/0042 320/108 |
| 2013/0234661 A1* | 9/2013 | Yang | H02J 7/0013 320/108 |
| 2013/0241735 A1* | 9/2013 | Nylen | H02J 5/005 340/636.1 |
| 2013/0257363 A1* | 10/2013 | Lota | H02J 7/0047 320/108 |
| 2013/0257368 A1 | 10/2013 | Lau et al. | |
| 2013/0278207 A1 | 10/2013 | Yoo | |
| 2013/0285601 A1* | 10/2013 | Sookprasong | H02J 50/10 320/108 |
| 2013/0300355 A1* | 11/2013 | Jung | H02J 50/12 320/108 |
| 2013/0307468 A1* | 11/2013 | Lee | H02J 7/0052 320/108 |
| 2013/0314036 A1* | 11/2013 | Nakagawa | H02J 5/005 320/108 |
| 2013/0335005 A1* | 12/2013 | Ohama | G06Q 30/02 320/106 |
| 2014/0015328 A1* | 1/2014 | Beaver | B60L 53/126 307/104 |
| 2014/0035379 A1* | 2/2014 | Stevens | H02J 7/0013 307/104 |
| 2014/0035380 A1* | 2/2014 | Stevens | H02J 5/005 307/104 |
| 2014/0084863 A1* | 3/2014 | Nakamura | H02J 5/005 320/108 |
| 2014/0103732 A1* | 4/2014 | Irie | H02J 5/005 307/104 |
| 2014/0114373 A1* | 4/2014 | Aghassian | H02J 50/90 607/45 |
| 2014/0132201 A1* | 5/2014 | Tsang | H02J 7/0044 320/107 |
| 2014/0152248 A1 | 6/2014 | Yeh | |
| 2014/0165607 A1 | 6/2014 | Alexander | |
| 2014/0167688 A1 | 6/2014 | Doyle et al. | |

(56) References Cited

U.S. PATENT DOCUMENTS

| | | | | |
|---|---|---|---|---|
| 2014/0175895 A1* | 6/2014 | Ishi | ............... | H02J 5/005 307/104 |
| 2014/0203662 A1* | 7/2014 | Bae | ............... | H02J 50/12 307/104 |
| 2014/0203770 A1* | 7/2014 | Salter | ............... | H02J 7/0047 320/108 |
| 2014/0210405 A1 | 7/2014 | Yang | | |
| 2014/0225558 A1* | 8/2014 | Park | ............... | H02J 7/0055 320/108 |
| 2014/0253032 A1* | 9/2014 | Bruwer | ............... | H02M 3/33507 320/108 |
| 2014/0285008 A1* | 9/2014 | Azancot | ............... | H02J 7/0044 307/104 |
| 2014/0305927 A1 | 10/2014 | Alexander | | |
| 2014/0307439 A1* | 10/2014 | Chien | ............... | F21V 33/00 362/253 |
| 2015/0103458 A1* | 4/2015 | Liffring | ............... | H01F 38/14 361/93.1 |
| 2015/0123483 A1 | 5/2015 | Leabman et al. | | |
| 2015/0244199 A1* | 8/2015 | Chen | ............... | H04B 5/0037 320/108 |
| 2016/0181859 A1 | 6/2016 | Makwinski et al. | | |
| 2016/0380467 A1* | 12/2016 | Shao | ............... | H02J 50/12 320/108 |
| 2017/0025886 A1 | 1/2017 | Rohmer et al. | | |
| 2017/0273455 A1* | 9/2017 | Lukas | ............... | A47B 9/04 |

FOREIGN PATENT DOCUMENTS

| | | | |
|---|---|---|---|
| KR | 10 2006 0106632 | | 10/2006 |
| KR | 10 2009 0098239 | | 9/2009 |
| KR | 20130095124 A | | 8/2013 |
| KR | 20160095646 A | * | 8/2016 |

OTHER PUBLICATIONS

International Search Report for International Patent Application No. PCT/US2015/057777 dated Mar. 7, 2016.

Search Report dated Dec. 21, 2015 of corresponding PCT Application No. PCT/US2015/048815.

Supplementary European Search Report for Serial No. EP 15 85 5598 dated Mar. 15, 2018.

\* cited by examiner

ECOSYSTEM FOR SURFACE-BASED WIRELESS CHARGING SYSTEM

CROSS-REFERENCE TO PRIOR APPLICATION

This application claims priority to provisional application 62/095,451, filed Dec. 22, 2014, and provisional application 62/097,723, filed Dec. 30, 2014, each of which is hereby incorporated herein by reference in its entirety.

TECHNICAL FIELD

The present disclosure relates generally to wireless power and, more particularly, to wireless charging systems.

BACKGROUND

Wireless power transmitters, such as the magnetic resonance units developed in accordance with the Rezence standard by the Alliance for Wireless Power, which is now know as the AirFuel Alliance, can transmit power to a suitably equipped receiving device through a non-metallic surface. Typically the transmitter is a standalone product with its own dedicated power supply which must be plugged into a receptacle connected to 120V branch circuit power (or the equivalent in other countries).

SUMMARY

According to the present disclosure, a wireless charging system comprises a surface, a first power supply mounted underneath the surface, a first power distribution system mounted underneath the surface, and at least one wireless charging transmitter mounted underneath the surface, wherein the first power supply is connected to a first wireless charging transmitter of the at least one wireless charging transmitter through the first power distribution system, and wherein the first wireless charging transmitter is configured to create a first charging area on the top side of the surface.

According to the present disclosure, a wireless charging system includes a surface, a first power supply, a second power supply, a first power distribution system, a second power distribution system, a first wireless charging transmitter, a second wireless charging transmitter, a first occupancy sensor; and a second occupancy sensor, wherein the first power supply is connected to the first wireless charging transmitter through the first power distribution system, wherein the second power supply is connected to the second wireless charging transmitter through the second power distribution system, wherein the first occupancy sensor is configured to control whether the first power supply supplies power to the first wireless charging transmitter based on the detection of the presence and/or absence of a user in the vicinity of the first occupancy sensor, and wherein the second occupancy sensor is configured to control whether the second power supply supplies power to the second wireless charging transmitter based on the detection of the presence and/or absence of a user in the vicinity of the second occupancy sensor.

According to the present disclosure, a wireless charging system comprises a surface, a first power supply, a second power supply, a first power distribution system, a second power distribution system, a first wireless charging transmitter, a second wireless charging transmitter, at least one occupancy sensor, and a control interface, wherein the first power supply is connected to the first wireless charging transmitter through the first power distribution system, wherein the second power supply is connected to the second wireless charging transmitter through the second power distribution system, and wherein the control interface is configured to control whether the first power supply supplies power to the first wireless charging transmitter as well as whether the second power supply supplies power to the second wireless charging transmitter based on information received from the at least one occupancy sensor.

These and other aspects, features and advantages of the present disclosure will become apparent in light of the following detailed description of non-limiting embodiments, with reference to the accompanying drawings wherein like numerals represent like elements.

DETAILED DESCRIPTION

Before the various embodiments are described in further detail, it is to be understood that the invention is not limited to the particular embodiments described. It will be understood by one of ordinary skill in the art that the systems and devices described herein may be adapted and modified as is appropriate for the application being addressed and that the systems and devices described herein may be employed in other suitable applications, and that such other additions and modifications will not depart from the scope thereof.

In the drawings, like reference numerals refer to like features of the systems and devices of the present application. Accordingly, although certain descriptions may refer only to certain figures and reference numerals, it should be understood that such descriptions might be equally applicable to like reference numerals in other figures. Additionally, although various features have been shown in different figures for simplicity, it should be readily apparent to one of skill in the art that the various features may be combined without departing from the scope of the present disclosure.

Figure 1:
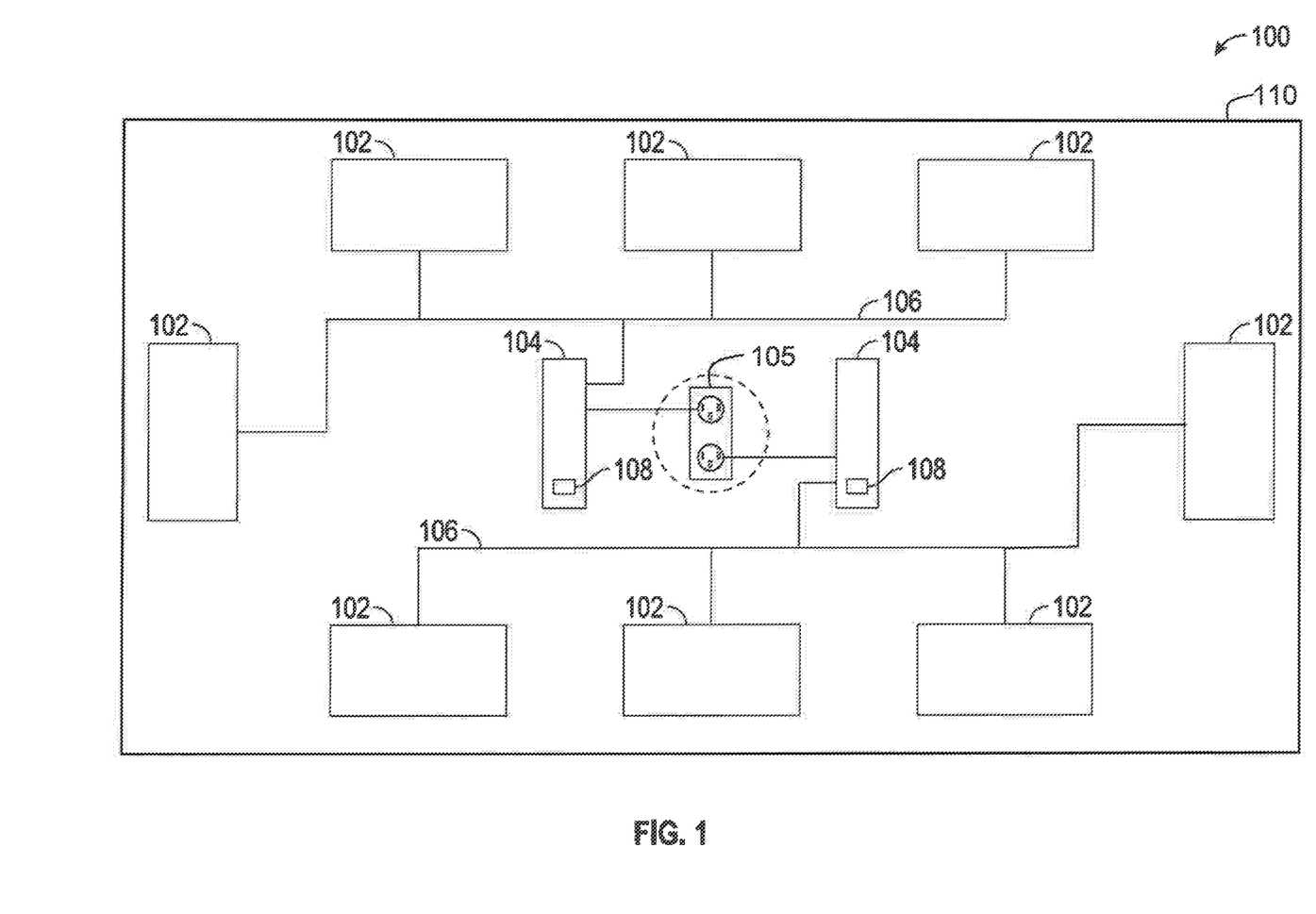
FIG. 1 is a schematic illustration of a plan view of an exemplary wireless charging system.

FIG. 1 shows a wireless charging system 100 according to an embodiment of the present disclosure. The wireless charging system 100 is mounted to the underside of a large surface. In FIG. 1, the large surface is in the form of a conference-room table 110. It should be understood, however, that the wireless charging system 100 can be mounted to any other surface in accordance with the principles of the present disclosure including without limitation a desk, a bar, a countertop, or a community table in a lobby, coffee shop, waiting room, library, airport lounge, or gate area. The wireless charging system 100 includes multiple wireless charging transmitters 102, at least one power supply 104 and a power distribution system 106 connecting each wireless charging transmitter 102 to a power supply 104 of the at least one power supply 104. The wireless charging transmitters 102 may be in the form of rectangular-shaped mats that are mounted to the underside of the table 110, as seen in FIG. 1, and are configured to emit charging fields upward through the table 110 to charge devices on the top surface of the table 110. It should be understood that the form of the wireless charging transmitter 102 is not limited to being rectangular shaped and may take on various other shapes in accordance with the principles of the present disclosure including without limitation circular mats, elliptical mats, square mats or any other suitably shaped mats. In FIG. 1, eight transmitters 102 are shown, although it should be understood that any number of transmitters can be used in accordance with the principles disclosed in the present disclosure. The wireless charging transmitters 102 may be mounted to portions of the table 110 adjacent to the locations where individuals will sit so that the individuals can easily orient their devices requiring charging on charging areas located on the top surface of the table above the wireless charging transmitters 102. Thus, the wireless charging transmitters 102 can wirelessly provide power to charge suitably configured devices that are put on the top of the surface in the vicinity of the transmitters 102. Such devices can include, for example, smart phones, tablets, and laptop computers.

The at least one power supply 104 of the wireless charging system 100 provides power to one or more of the wireless charging transmitters 102. In FIG. 1, two power supplies 104 are shown, each power supply 104 providing power to four of the eight wireless charging transmitters 102. The power supply may have an ordinary corded plug at one end that can be plugged into an ordinary electrical receptacle 105 that supplies AC power. Alternatively, the power supply may be hardwired to a source of AC power. The receptacle may be, for example, part of an in-floor poke-through device that is located beneath the table 110. If the power supply is plugged into an ordinary AC electrical outlet 105 or hardwired to a source of AC power, then it may contain an AC/DC converter so that the output of the power supply will be DC (direct current) power as should be understood by those skilled in the art. Each power supply 104 can be mounted directly to the underside of the conference table 110 at a location that is closer to the center of the table 110 than the locations of the wireless charging transmitters 102, which may be located more towards the periphery of the table 110 so that they establish charging areas that are near the periphery of the table 110 and are, therefore, easily accessible by those seeking to charge their devices. Each power supply 104 may be secured to the underside of the table 110 via brackets or mounts, or in a special purpose enclosure. Alternatively, each power supply 104 can be integrated into the table or can be integrated within other products that support power delivery to the table, such as floorboxes, power columns, transition channels, and the like as should be understood by those skilled in the art.

As discussed above, the wireless charging system 100 also includes a power distribution system 106 for connecting the output of the at least one power supply 104 to each one of the wireless charging transmitters 102 that is connected to the power supply 104. In FIG. 1, a power distribution system 106 is shown for each of the two power supplies 104. The power distribution system 106 can take many different forms. For example, the power distribution system 106 may be a separate cable for each connected wireless charging transmitter 102 running to the power supply 104. The cables can be stand-alone cables with dedicated cable management or they can be routed through a common conduit for cable-management purposes. Alternatively, the power distribution system 106 can be in the form of a solid bus bar with extensions from the bus bar to each connected wireless charging transmitter 102. Additionally, instead of rigid extensions from the bus bar to each connected transmitter 102, flexible cables that tap into the bus bar may be used. In FIG. 1, the power distribution systems 106 are shown as solid bus bars for ease of illustration.

Each power supply 104 may include a single on-off switch 108. Alternatively each power supply 104 may include a separate on-off switch for each one of the wireless charging transmitters 102 connected thereto. If the power supply 104 contains a single on-off switch 108, the switch can be physically located upstream of the main components of the power supply 104 itself so that when the switch is off even those components cannot draw power. For example, a typical AC/DC converter draws some power even when no loads are connected to its output and, therefore, locating the switch 108 upstream of such components will prevent them from drawing power when the power supply 104 is switched off.

The capacity of the at least one power supply 104 may be selected according to the power ratings of the individual wireless charging transmitters 102 connected to the at least one power supply 104. For example, a 120 W power supply 104 may be connected to four 30 W wireless charging transmitters 102. Additionally, a fifth or more wireless charging transmitter 102 may be connected to the same at least one power supply 104 to increase the effective charging area of the wireless charging system 100, since in practice, all four wireless charging transmitters may never draw 30 W at the same time, because, in reality, users may not simultaneously charge devices on all four wireless charging transmitters 102. The system 100 of the present disclosure is adaptable in this way.

The wireless charging system 100 has several advantages over a system in which each wireless charging transmitter has its own power supply. For example, by using shared power supplies 104 there are less power cords that must be plugged in to a receptacle, thereby reducing the clutter associated with a number of cords and reducing the total number of receptacles required. This is especially advantageous when the receptacles are located below the surface to which the wireless charging transmitters 102 are mounted such as either in the floor or directly on the floor. For example, the receptacles 105 may be located in one or more poke-through devices or floor-boxes located in the floor below a conference room table 110. Alternatively, the receptacles 105 may be located just above the surface of the floor in, for example, a floor-mounted box. By reducing the number of cords extending to such receptacles 105, the wireless charging system 100 advantageously reduces potential tripping hazards. Another advantage is that a shared powered supply 104 can be mounted at a more central location of the conference table 110 than the wireless charging transmitters 102, which makes them less likely to be a nuisance to people sitting at the table 110. Advantageously, shared power supplies 104 also allow a set of connected wireless charging transmitters 102 to be powered on and off together, through a single switch 108 on the power supply 104. Using a shared power supply 104 can also advantageously reduce the total wattage required for the system 100. For example, when each wireless charging transmitter has its own power supply, that power supply must be able to supply the minimum number of watts required to charge a device that the wireless charging transmitter is rated to charge. With a shared power supply 104, however, the total watts for the power supply 104 need not be the sum of the required watts for the connected wireless charging transmitters 102. Instead, as discussed above, the fact that it is not likely that all of the connected wireless charging transmitters 102 will be loaded with a device to be charged at the same time may allow the power supply 104 to generate a total power that is less than what would be necessary to power all of the connected transmitters 102 as if they were loaded at the same time.

Figure 2:
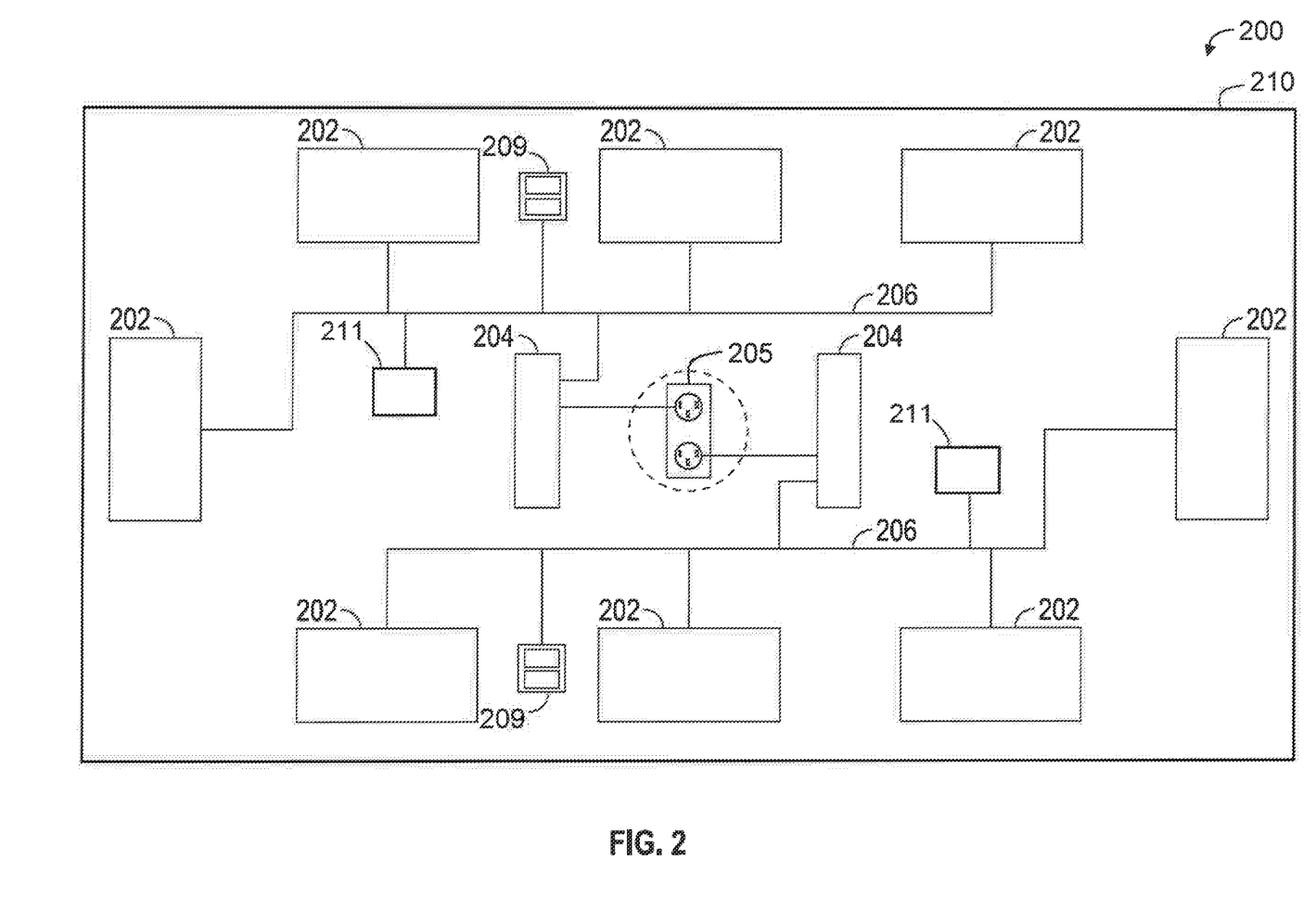
FIG. 2 is a schematic illustration of a plan view of an exemplary wireless charging system.

FIG. 2 shows a wireless charging system 200 that, like the embodiment in FIG. 1, includes wireless charging transmitters 202 that are electrically connected to shared power supplies 204 through electrical distribution systems 206. Wired charging points 209 are also connected to the power supplies 204 in addition to the wireless charging transmitters 202. The wired charging points 209 may be, for example, in the form of USB sockets. The exemplary embodiment of FIG. 2 shows two wired charging points 209 that each have two USB sockets. However, as should be understood by those skilled in the art, different numbers of wireless charging points 209 may be provided having different numbers of USB sockets. The wired charging points 209 may be integrated with the table 210 such that they are flush with the surface of the table 210 or they may be mounted to the top surface or to the underside of the table 210. The wired charging points 209 advantageously permit charging of devices that are not designed to interact and be charged by wireless charging transmitters 202. Since the wireless charging points 209 are connected to the shared power supplies 204 through the electrical distribution system 206, the wired charging points 209 do not require their own power supply and attendant power cord, which would create clutter underneath the table 210 and occupy the limited number of floor receptacles 205 as discussed above. Instead, they are simply electrically connected to the shared power supplies 204. As should be understood by those skilled in the art, a step-down power regulator may be required to connect the wireless charging points 209 to the shared power supplies 204.

In embodiments, the wireless charging system 200 may be configured with USB3.1 so that wired charging points 209, in the form USB sockets, may also be connected to a USB hub 211, for example, through the electrical distribution system 206 to allow data transmission and/or exchange between the wired charging points 209 and the USB hub 211. These USB3.1 wired charging points 209 may allow a device connected to one of the wired charging points 209 to send data and/or digital video back to the USB hub 211, which may, in turn, be connected to a display or projector, thereby allowing the device to display video output on the display or projector while being charged and/or powered by the wired charging points 209. Wired charging points 209 may include USB Type-C Connectors and may comply with the USB PD (Power Delivery) specification. When a wired charging point 209 is compliant with the USB PD specification, power for one or more of the transmitters 202 can be supplied through a cable connected to the wired charging point instead of through a shared power supply 204.

Additionally, since USB3.1 may provide higher currents and supply voltages, the wired charging points 209 that are USB3.1 connections may advantageously power devices with larger energy demands, such as laptops, and/or may also provide power to the wireless charging transmitters 202 over this USB connection.

Figure 3:
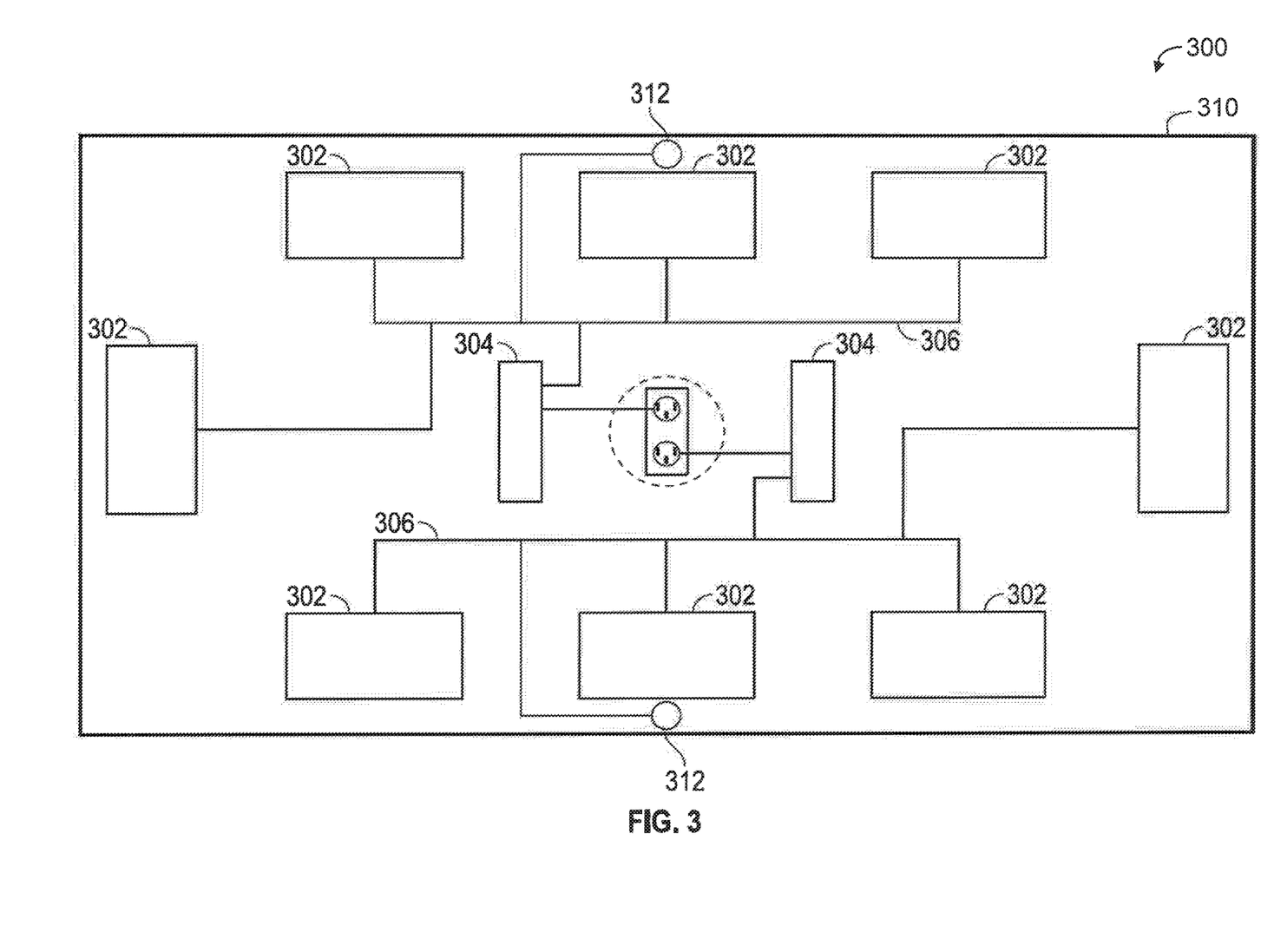
FIG. 3 is a schematic illustration of a plan view of an exemplary wireless charging system.

FIG. 3 shows a wireless charging system 300 that, like the embodiment in FIG. 1, includes wireless charging transmitters 302 that are electrically connected to shared power supplies 304 through electrical distribution systems 306. The wireless charging system 300 also includes at least one occupancy sensor 312 that senses the presence or absence of a person in the vicinity of sensor. The exemplary embodiment of FIG. 3 shows a wireless charging system with two occupancy sensors 312. However, as should be understood by those skilled in the art, fewer or more occupancy sensors 312 may be provided as desired or necessary. The occupancy sensors 312 may use any of a variety of technologies to sense the presence of a person including, without limitation, passive infrared energy, ultrasound energy, or video imaging. The occupancy sensors 312 can be physically mounted to the underside and/or the top of the conference table 310. The occupancy sensors 312 may also be mounted to the ceiling or wall of the room or any other suitable location for detecting the presence or absence of persons. The occupancy sensors 312 can be used as a switch to control whether the wireless charging transmitters 302 are powered on or off. For example, as shown in FIG. 3, the occupancy sensors 312 can be electrically connected to the power supplies 304 through the electrical distribution system 306 and can send occupancy signals to the power supplies 304 through such electrical connection. The occupancy signals can be used to control whether the power supplies 304 provide power to the wireless charging transmitters 302 by, for example, controlling a switch within each power supply 304. System logic in the power supplies 304 could be set to only turn off power to the transmitters 302 if the sensors 312 detect that nobody is present and no device is currently being charged.

As shown in FIG. 3, the occupancy sensor 312 on one side of the table 310 may be electrically connected to the shared power supply 304 for the wireless charging transmitters 302 on that side of the table 310 and the occupancy sensor 312 on the other side of the table 310 can be electrically connected to the shared power supply 304 for the wireless charging transmitters 302 on the other side of the table 310. In this configuration, the detection of the presence of a person on one side of the table 310 will power the wireless charging transmitters 302 on that side of the table 310 but, advantageously, will not power the wireless charging transmitters 302 on the other side of the table 310. This construction prevents unnecessary powering of all of the wireless charging transmitters 302 as the person is unlikely to reach over to the other side of the table 310 to charge a device when there are charging areas on the person's side of the table 310.

Figure 4:
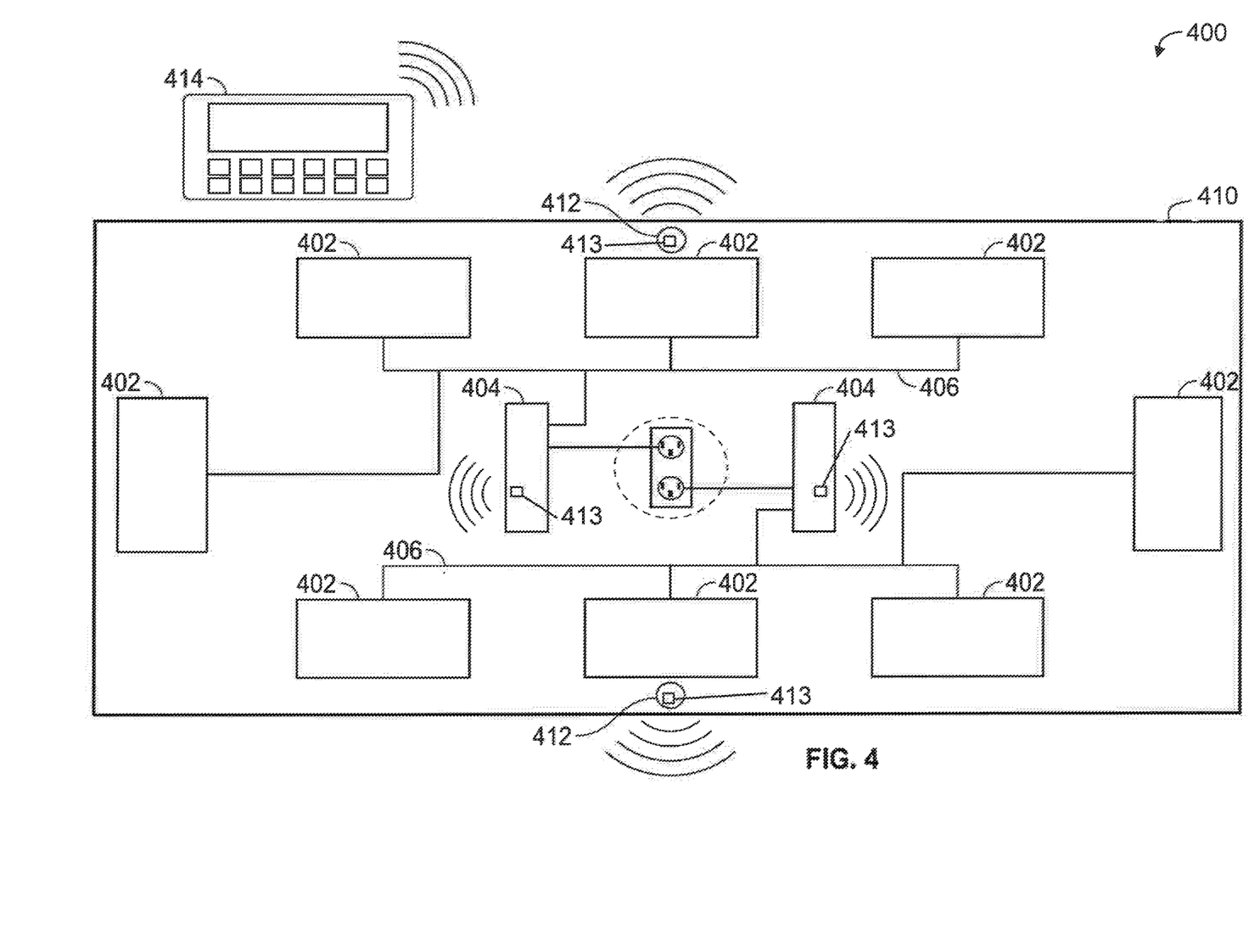
FIG. 4 is a schematic illustration of a plan view of an exemplary wireless charging system.

FIG. 4 shows a wireless charging system 400 that, like the embodiment in FIG. 3, includes wireless charging transmitters 402 that are electrically connected to shared power supplies 404 through electrical distribution systems 406. The wireless charging system 400 also includes at least one occupancy sensor 412 that senses the presence or absence of a person in the vicinity of sensor. In the wireless charging system 400, the two exemplary occupancy sensors 412 and the power supplies 404 include wireless transceivers 413 that allow them to communicate with a wireless network. A control interface 414 is also connected to the network and able to communicate with the power supplies 404 and sensors 412. The control interface 414 can be a stand-alone hardware device or it could be a laptop, tablet, smart phone or other similar device with appropriate application software. The control interface 414 can be used to control the on/off status of each power supply 404 based upon information from the occupancy sensor 412 or other information such as the date and/or the time. The control interface 414 can also control more than just the power supplies 404 and may be the control interface for controlling various other equipment inside the particular room in which the system 400 is located. In a conference room, for example, the control interface 414 could be used to control the lights, the shades, the projector, the projector screen, the audio, the HVAC, and the like, in addition to the shared power supplies 404 for the wireless charging transmitters 402. The control interface 414 can optionally connect to a broader building network or to the interne so that the power supplies 404 and their connected wireless charging transmitters 402 can be controlled from outside the room.

As discussed above, the wireless charging transmitters 102, 202, 302, 402 can wirelessly provide power to a charging area on the top surface of table 110, 210, 310, 410 such that suitably configured devices that are placed on the top surface of the table 110, 210, 310, 410 in the vicinity of the charging area become charged. However, without more indication, the charging area may be effectively invisible on the top surface.

Figure 5:
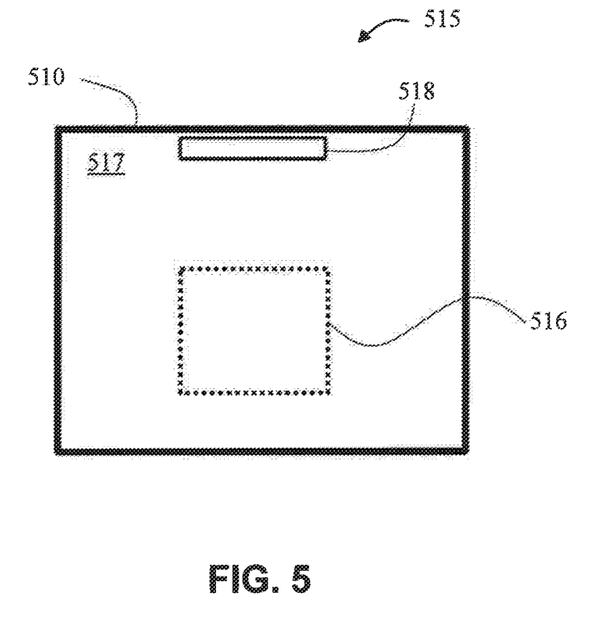
FIG. 5 is a schematic top view of an exemplary indication system for the wireless charging systems of FIGS. 1-4.

FIG. 5 shows an indication system 515 that may be incorporated into or used with the wireless charging systems 100, 200, 300, 400 to provide an indication of a charging area 516 on a top surface 517 of the table 510 powered by a wireless transmitter such as the wireless transmitters 102, 202, 302, 402. The indication system 515 includes a satellite 518. Satellite 518 may be located on the top surface 517 of the table 510 as shown. Alternatively, satellite 518 may be located elsewhere; for example, it may be mounted to a wall or the ceiling of the room. The satellite 518 is configured to project light to the top surface 517 of the conference-room table 510 to provide an indication of the location of the charging area 516. As seen in FIG. 5, the satellite 518 may have a width that essentially matches a width of the charging area 516 as an additional visual cue as to the size of the charging area 516. However, it should be readily understood that the width of the satellite 518 may be larger or smaller than the width of the charging area 516.

The exemplary satellite 518 illustrated in FIG. 5 is shown in a state of non-use and, thus, there is no indication of the charging area 516 visible on the top surface 517.

Figure 6:
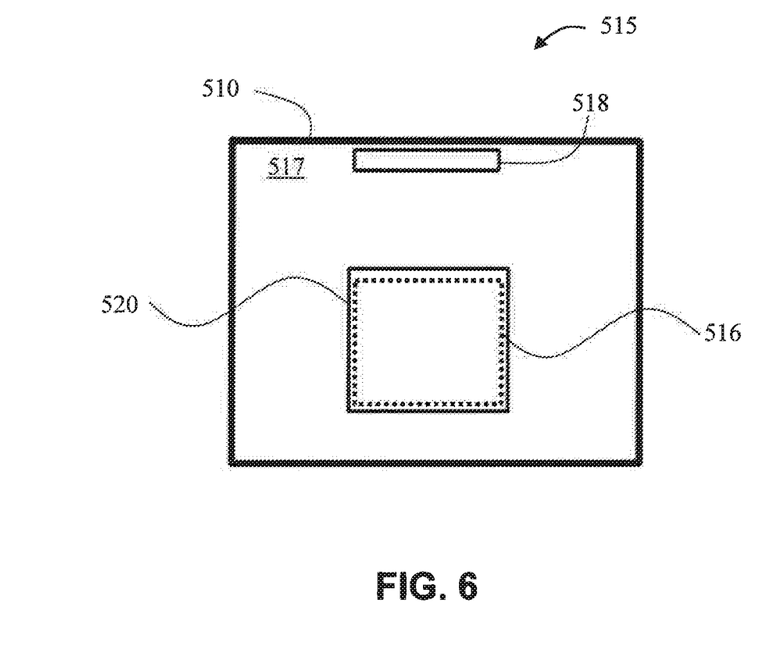
FIG. 6 is a schematic top view of an exemplary indication system for the wireless charging system.

Referring to FIG. 6, the indication system 515 is shown in a state of use with the satellite 518 projecting light to form a target area pattern 520 approximating the exact size, shape, and location of the charging area 516 on the top surface 517 of the conference-room table 510. The projected pattern 520, thus, provides a visible indication of the size, shape and location of the charging area 516 to the user. Thus, the projected pattern 520 may be described as providing a complete indication of the charging area properties.

Figure 7:
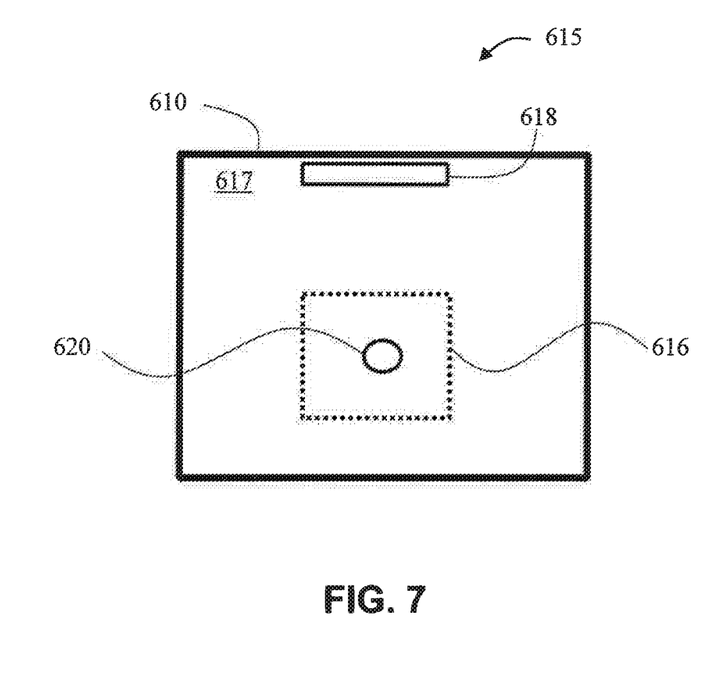
FIG. 7 is a schematic top view of an exemplary indication system for the wireless charging systems of FIGS. 1-4.

FIG. 7 shows another exemplary indication system 615 similar to the indication system 515 shown in FIGS. 5 and 6. The indication system 615 includes a satellite 618. Satellite 618 may be located on the top surface 617 of the conference-room table 610 as shown. Alternatively, satellite 618 may be located elsewhere; for example, it may be mounted to a wall or the ceiling of the room. Satellite 618 is configured to project light on the top surface 617 of the conference-room table 610. In operation, the satellite 618 projects light to form a target area pattern 620 on top surface 617 of table 610. The target area pattern 620 is smaller in size than the actual charging area 616 and may be projected at an approximate center of the charging area 616 on the conference-room table 610. While the projected pattern shown in FIG. 7 is a circle, it should be readily understood that the projected pattern may be of any shape. Additionally, the projected shape may advantageously be the same shape as the charging area 616, just smaller in size, to provide an indication of not only the location but also the size of the charging area 616. Thus, the projected pattern 620 provides a visible indication of the charging area 616 to the user. Thus, the projected pattern 620 can be described as a basic indication since it provides the location of the charging area 616 and possibly the shape, but not the size.

Figure 8:
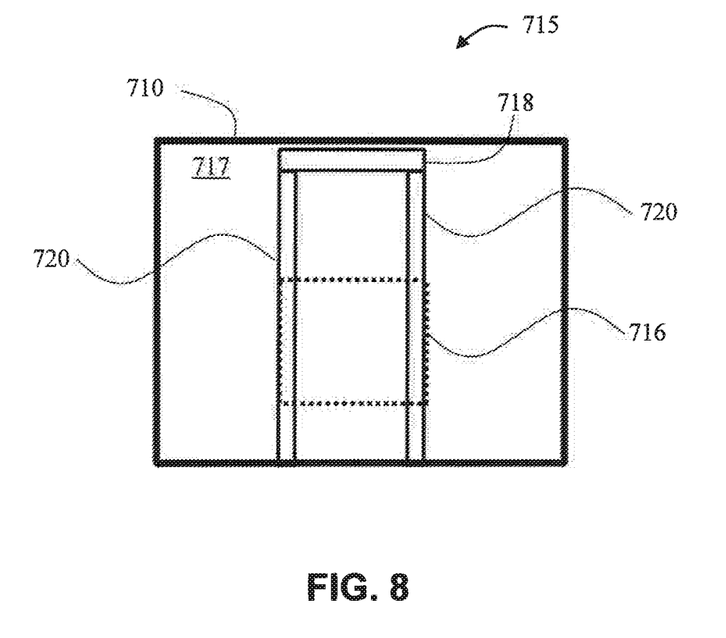
FIG. 8 is a schematic top view of an exemplary indication system for the wireless charging systems of FIGS. 1-4.

FIG. 8 shows another exemplary indication system 715 similar to the indication systems shown in FIGS. 5-7. The indication system 715 includes a satellite 718. Satellite 718 may be located on the top surface 717 of the conference-room table 710 as shown. Alternatively, satellite 718 may be located elsewhere; for example, it may be mounted to a wall or the ceiling of the room. Satellite 718 is configured to project light on the top surface 717 of the conference-room table 710. In operation, the satellite 718 projects beams of light to form a target area pattern 720 on the top surface of the conference-room table 710. The beams of light are aligned with the lateral edges of the charging area 716. Thus, the beams of light may guide the user's lateral placement of devices for charging. The target area pattern 720 in the form of projected beams of light, thus, provides a visible indication of charging area 716. The target area pattern 720 can be described as a guideline indication since it only provides some indication of the outer boundaries of the charging area 716.

Figure 9:
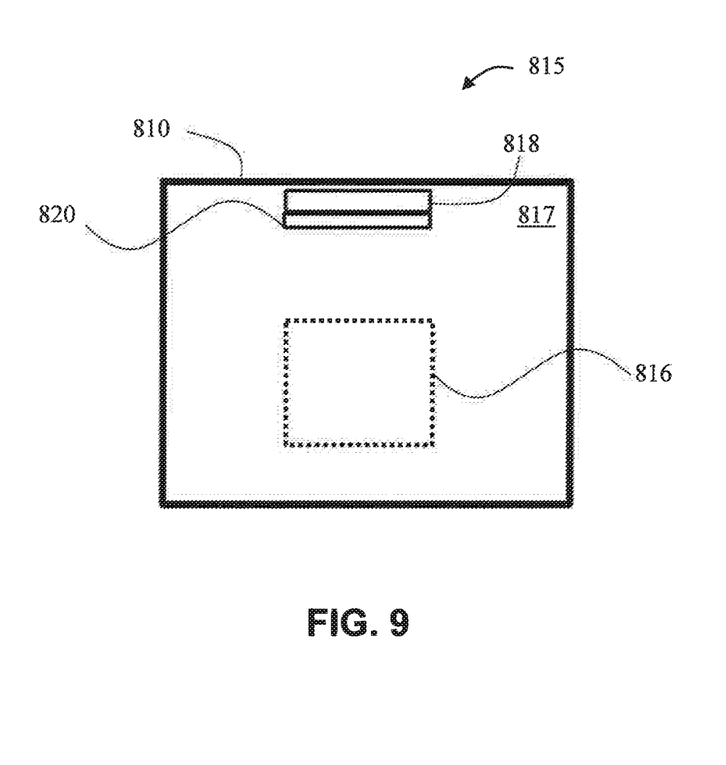
FIG. 9 is a schematic top view of an exemplary indication system for the wireless charging systems of FIGS. 1-4.
Figure 10:
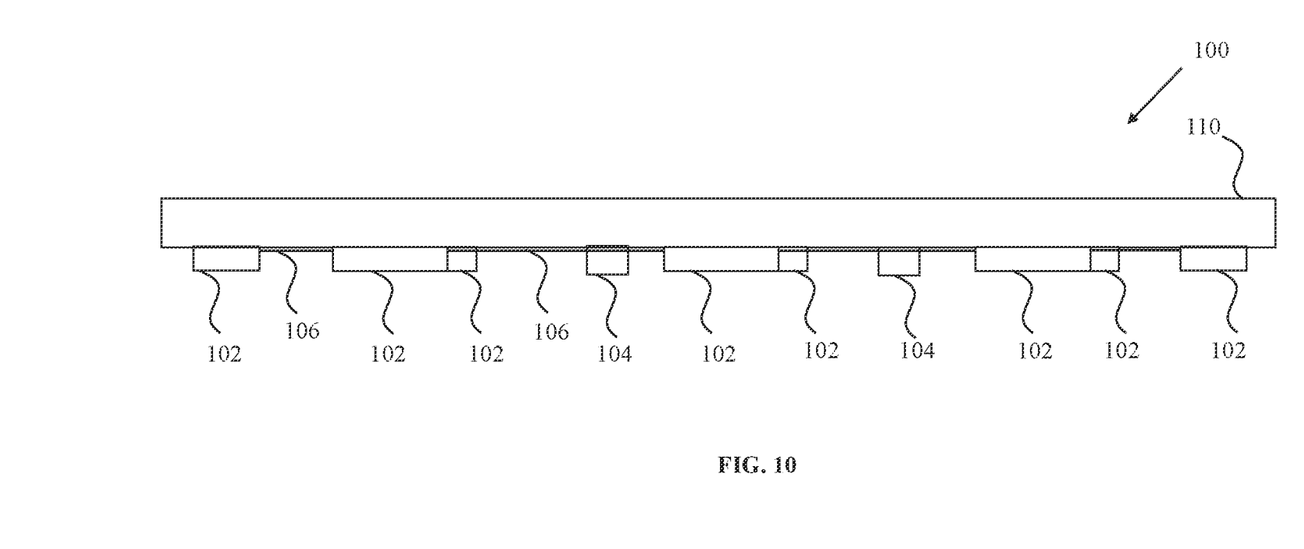
FIG. 10 is a schematic illustration of a side view of the exemplary wireless charging system of FIG. 1.

FIG. 9 shows another exemplary indication system 815 similar to the indication systems shown in FIGS. 5-8. The indication system 815 includes a satellite 818. Satellite 818 may be located on the top surface 817 of the conference-room table 810 as shown. Alternatively, satellite 818 may be located elsewhere; for example, it may be mounted to a wall or the ceiling of the room. Satellite 818 is configured to project light on the top surface 817 of the conference-room table 810. In operation, the satellite 818 projects light to form a target area pattern 820 as an edgelight indication that is a simple glow at the edge of the table 810 on the side of the satellite 818 as shown (when the satellite 818 is mounted on the top surface 817 of the conference-room table 810) or the edge of the opposite side of the table. The projected glow pattern 820 provides an indication of the charging area 816. In particular, the projected pattern 820 at the edge of the table 810 or satellite 818 provides an indication that a charging area 816 is present on the table 810 in front of the light. Alternatively, instead of satellite 818, an indicator bar may be integrated with or mounted to the side thickness of the table to indicate the approximate location of charging area 816.

While FIGS. 5-9 depict particular forms for providing visual indications for the charging areas 516, 616, 716, 816 on the top surfaces 517, 617, 717, 817 of the conference-room table 510, 610, 710, 810, it should be readily understood that the spirit and scope of the present disclosure includes other similar embodiments and is not limited to these exemplary indications. For example, indications may be provided where two or more charging areas are illuminated by one satellite. Additionally, although shown separately for simplicity, it should be readily understood that the various exemplary indication systems could be combined together and multiple indication systems could be incorporated into a single wireless charging system.

Additionally, for all of the lighting configurations, the light could vary its intensity and/or color dynamically as a device moves near the target charging area to help guide its final movement into the best placement position for optimal charging. These prompts could be in addition to, or in conjunction with, other cues such as audible or haptic indicators.

In addition to indicating the location of the charging areas 516, 616, 716, 816, the projected light may indicate the charging status of the device via variations in color, intensity, pattern, etc. For example, it could initially be white in the absence of a device to be charged, change to green to indicate that a charging state had been achieved, and then to blue to indicate a full battery condition. Additionally, the light may include a single source or be made up of multiple coordinated sources in order to best fulfill its intended functions.

The satellites 518, 618, 718, 818 may be combined with sensors such as the occupancy sensors 312, shown in FIG. 3, to modify its operation in the presence of a user, for example to turn on when a user approaches or to turn off when no one is present.

The wireless charging system 100 may advantageously provide various charging areas on a table surface—either for the convenience of the user, or to accommodate multiple devices simultaneously in different locations—without requiring multiple transmitters that each have their own power supply and attendant power cord installed in an array across the lower surface of the table.

The present disclosure advantageously provides an organized wireless charging system for a large surface, such as a conference-room table or the like, that avoids the clutter associated with using multiple independent charging transmitters that have their own power supplies.

The present disclosure also advantageously provides visible indications where otherwise invisible charging areas of the wireless charging systems are located because, although an under table wireless power transmitter can provide a user a way to charge their device on the table without any unsightly or encumbering characteristics of typical charging cords or docks, the very nature of the installation can make the effective charging, or target, area of the table—where the user must place their device to effectively charge—invisible. The visible indications may be in the form of light configured to provide a distinct lighted pattern that may correspond exactly to the target charging area. Alternatively, it could indicate the target area via a subtle glow in the approximate location, such as a spot indicator in the center of the charge area, guiding columns of light at either edge of the area, or simply a light near the edge of the table indicating the presence and approximate lateral location of a charging area. The illuminated indicators of the present disclosure provide advantages over using physical features (e.g. mats, ridges, raised or depressed areas, differing finishes, etc.) including labels or icons, which can ruin the clean aesthetic of the installation.

Various modifications to the specific examples described in this disclosure and depicted in the drawings will be apparent to a person having ordinary skill in the art. For example, the wireless charging transmitters discussed above may use magnetic-resonance-based wireless charging technology, which is best suited to through-surface operation. However, the systems of the present disclosure can alternatively employ wireless charging transmitters that use inductive wireless-charging technology. For example, the wireless charging systems can employ wireless charging transmitters that are compliant with the Wireless Power Consortium's Qi standard or the Power Matters Alliance's PMA standard. As should be understood by those skilled in the art, the distance over which power can be transmitted wirelessly is much smaller for inductive technologies than for magnetic resonance technologies and, therefore, the wireless charging transmitters would need to be mounted directly to the top of the surface instead of the underside or would need to be embedded just below the top of the surface.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. A wireless charging system comprising:
a power supply;
a plurality of wireless charging transmitters adapted to be mounted on an underside of a surface;
a power distribution system adapted to connect the plurality of wireless charging transmitters to the power supply; and
an occupancy sensor configured to detect presence or absence of a user in the vicinity of the occupancy sensor, the user being a person, wherein the occupancy sensor is configured to send a signal to the power supply to power on the connected wireless charging transmitters when the presence of the user is detected and to power off the connected wireless charging transmitters when the absence of the user is detected;
wherein the plurality of wireless charging transmitters are configured to generate a plurality of separate charging areas on a top side of the surface; and
wherein a total combined power rating of the plurality of wireless charging transmitters is greater than the capacity of the power supply.

2. The wireless charging system of claim 1, further comprising at least one wired charging point connected to the power supply through the power distribution system.

3. The wireless charging system of claim 2, wherein the at least one wired charging point is a USB socket.

4. The wireless charging system of claim 3, wherein the at least one wired charging point is configured to allow data transmission or exchange between a device connected to the at least one wired charging point and a USB hub connected to the power distribution system.

5. The wireless charging system of claim 1, further comprising:
a satellite configured to be mounted on the top side of the surface and to provide an indication of a location of a charging area on the top side of the surface.

6. The wireless charging system of claim 5, wherein the satellite is configured to project light to the top side of the surface at or near at least a portion of the charging area.

7. The wireless charging system of claim 5, wherein the satellite is configured to project light to the top side of the surface over the entire charging area.

8. The wireless charging system of claim 5, wherein the satellite is configured to project light at a center of the charging area.

9. The wireless charging system of claim 5, wherein the satellite is configured to project light to the top side of the surface at or near opposing edges of the charging area.

10. The wireless charging system of claim 5, wherein the satellite is configured to project light to the top side of the surface at an edge of the surface.

11. The wireless charging system of claim 5, wherein the satellite is configured to vary at least one of the intensity or color of the projected light based on a location of a device relative to the charging area.

12. The wireless charging system of claim 5, wherein the satellite is configured to vary at least one of the intensity or color of the projected light based on a charging status of a device.

13. The wireless charging system of claim 1, wherein at least one of the power supply or the occupancy sensor comprises a wireless transceiver configured to communicate with at least one of a wireless network or a communication interface.

14. A wireless charging system comprising:
a first power supply;
a second power supply;
a first plurality of wireless charging transmitters adapted to be mounted on an underside of a surface;
a second plurality of wireless charging transmitters adapted to be mounted on the underside of the surface;
a first power distribution system adapted to connect the first plurality of wireless charging transmitters to only the first power supply;
a second power distribution system adapted to connect the second plurality of wireless charging transmitters to only the second power supply;
a first occupancy sensor controlling a first supply of power from the first power supply to the first plurality of wireless charging transmitters based on occupancy detection in a vicinity of the first occupancy sensor; and
a second occupancy sensor controlling a second supply of power from the second power supply to the second plurality of wireless charging transmitters based on occupancy detection in a vicinity of the second occupancy sensor;
wherein the first occupancy sensor is configured to power on the first plurality of wireless charging transmitters when user occupancy is detected and to power off the first plurality of wireless charging transmitters when user occupancy is not detected, user occupancy being occupancy by a person; and
wherein the second occupancy sensor is configured to power on the second plurality of wireless charging transmitters when user occupancy is detected and to power off the second plurality of wireless charging transmitters when user occupancy is not detected, user occupancy being occupancy by a person.

15. A wireless charging system comprising:
a power supply;
a wireless charging transmitter adapted to be mounted on an underside of a surface and to generate a charging area on a top side of the surface;
a power distribution system adapted to connect the wireless charging transmitter to the power supply for supplying power from the power supply to the wireless charging transmitter;
an indication system configured to provide a visual indication of a location of the charging area on the top side of the surface; and
an occupancy sensor configured to detect presence or absence of people in a vicinity of the occupancy sensor, the occupancy sensor being configured to send signals to the power supply to power on the connected wireless charging transmitters when the presence of one or more of the people is detected and to power off the connected wireless charging transmitters when the absence of one or more of the people is detected;
wherein the indication system is configured to project light to the top side of the surface only over the entire charging area.

16. The wireless charging system of claim 15, wherein the indication system includes a satellite configured to vary at least one of intensity or color of projected light based on at least one of a charging status of a device or a location of the device relative to the charging area.

* * * * *

UNITED STATES PATENT AND TRADEMARK OFFICE
CERTIFICATE OF CORRECTION

| | |
|---|---|
| PATENT NO. | : 11,984,731 B2 |
| APPLICATION NO. | : 14/978251 |
| DATED | : May 14, 2024 |
| INVENTOR(S) | : Mark Makwinski et al. |

Page 1 of 1

It is certified that error appears in the above-identified patent and that said Letters Patent is hereby corrected as shown below:

On the Title Page

In References Cited:
Insert as follows:
U.S. Patent Documents, --US 8,210,708 B2--

Signed and Sealed this
First Day of April, 2025

Coke Morgan Stewart
*Acting Director of the United States Patent and Trademark Office*